Patented Apr. 24, 1923.

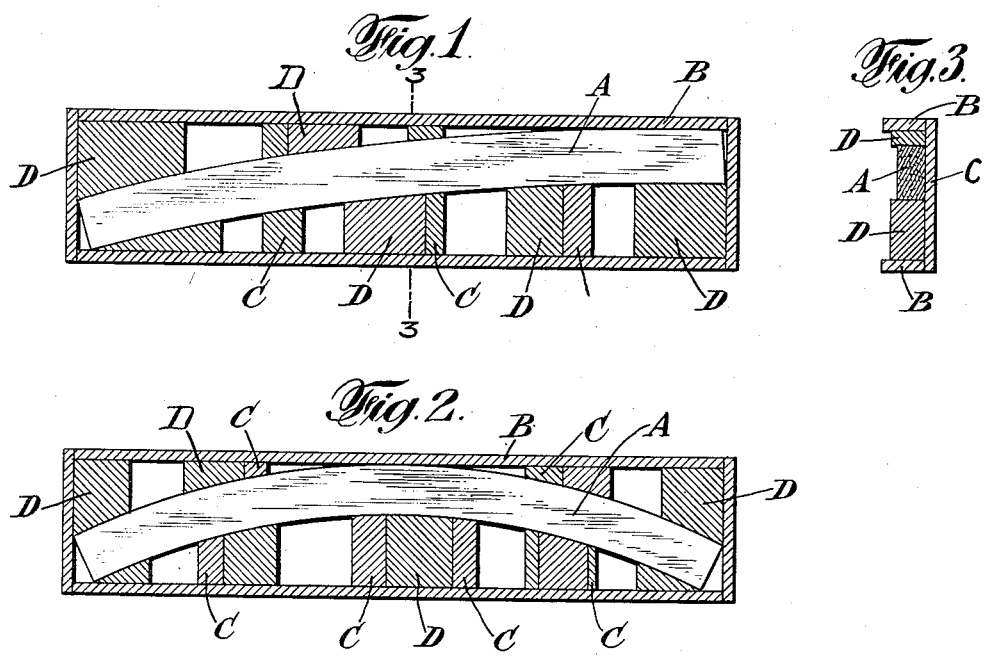

1,453,071

UNITED STATES PATENT OFFICE.

WILLIAM KLEEMAN, OF HARTWELL, CINCINNATI, OHIO, ASSIGNOR TO THE PHILIP CAREY MANUFACTURING COMPANY, A CORPORATION OF OHIO.

FORMING AND FORM-RETAINING MEANS FOR PLASTIC, OR SEMIPLASTIC, OR SIMILAR MATERIALS.

Application filed March 8, 1922. Serial No. 541,888.

*To all whom it may concern:*

Be it known that I, WILLIAM KLEEMAN, a citizen of the United States, and a resident of Hartwell, Cincinnati, in the county of Hamilton, State of Ohio (whose post-office address is Hartwell, Cincinnati, Ohio), have invented new and useful Improvements in Forming and Form-Retaining Means for Plastic, or Semiplastic, or Similar Materials, of which the following is a specification.

My invention relates to forming and form retaining means for plastic, or semiplastic, or similar, materials. It is especially adapted for use in formation of forms, and crating, of expansion joint filler material. Expansion joint filler material, adapted to compensate for expansion and contraction of adjacent sections of material such as concrete, brick, wood block and other materials, is a plastic, semi-plastic or elastic material, and is generally formed of a body of bituminous material such as asphalt, etc., either with or without a reinforcement. These expansion joint fillers are made in the form of rectangular board like slabs about six to eight feet long of a width generally from six to eight inches wide and of a thickness generally from one eighth of an inch to one inch and over. When used it is frequently necessary especially in paving construction to cut these joint fillers to crown both top and bottom or in other words to cut away the material from opposite edges so as to form an arc or curve. This results in a great waste of material and in some forms of joint filler, such as what is known as the all asphalt joint filler it is practically impossible to cut the joint filler in this manner and have it retain its form in shipment. This waste of material and the operation of cutting to crown, I have dispensed with while at the same time providing means for forming the joint fillers to desired shape and providing a light cheap crate in which the form will be retained while being shipped.

In the drawings

Fig. 1 shows one form of my invention.

Fig. 2 is another form of my invention.

Fig. 3 is a cross section line 3—3 of Fig. 1.

In the drawings, in which like letters refer to like parts, A is an expansion joint filler formed, in part or in whole, of a bituminous material. B, is a combined forming device and shipping crate composed of side members and end members. Extending across and attached to the side member of the forming device B are arranged one or more retainers C to support the joint filler A while also serving to strengthen the forming device B. If desired the retainer C could be one piece of wood, wire, or other suitable material. Any material suitable for the purpose could be used in making my forming device B and its parts but I prefer to make it of the lightest material that will have sufficient strength to be used as a container in shipping the joint filler. The forming device B being ready I place the joint A, which has been formed into a long board like slab, preferably before it has cooled or set, in the forming device and then having previously determined the arc or curve to which it is desired to have the joint filler A conform I place the arc forming blocks D, D, in position. These blocks are of different sizes and are preferably wider at one end than the other so as to have a wedge like form adapting them to be forced into position curving the joint filler and retaining it in the curved or arc formed condition. By placing the joint filler A in the forming device B and then inserting the forming blocks D, D, before the joint filler has cooled or set, for most of these joint fillers are formed using a heated bituminous material, it is readily formed to desired curve and retained in that form while being transported even under most varied changes of temperature. A number of joint fillers may be placed in the forming device B and all formed to the desired arc at the same time. When placing a plurality of joint fillers in the forming device B, I prefer, especially if the joint fillers are liable to adhere, to place between them a suitable strip of paper or to sprinkle soapstone, talc, mica flakes, or other suitable material to prevent adhesion.

My invention is especially adapted to what is known as the all asphalt paving joint filler and enables the manufacturers of such joint filler to form their joints to correspond with the desired curve and retain such form. Heretofore the inability to so form this all asphalt joint filler, to curve, has been one of the objections to this form of expansion joint filler and its manufacture.

If desired two or more slabs, to be formed to the same curve, can be placed in the same plane as slab A by making the forming device B wider.

I claim:

1. An arc forming and crating device, for plastic slabs, consisting of means for supporting a slab and removable wedge shaped means adapted to give the desired curve to the slab and retain same.

2. An arc forming and crating device, for plastic slabs, consisting of a frame for supporting a slab and wedge shaped means adapted to give the desired curve to the slab and retain same.

3. An arc forming and crating device, for plastic joint filler slabs, consisting of a frame for supporting a slab and wedge shaped means adapted when moved between the frame and the joint to give the desired curve to the slab and retain same.

4. A combined forming and crating device for expansion joints, formed of a plastic mass, consisting of a frame adapted to receive a joint before it has set, movable blocks adapted to hold an expansion joint in said frame and to impart to a joint the desired curvature before the joint has set and retain said joint in such form after it has set during temperature changes.

In testimony whereof, I have signed my name to this specification.

WM. KLEEMAN.